June 30, 1970  W. A. RIGGS  3,518,437
APPARATUS FOR MEASURING HAZE IN FLOWING LIQUIDS UTILIZING
AN OPERATIONAL AMPLIFIER WITH PHOTOSENSITIVE FEEDBACK
AND INPUT RESISTORS FOR COMPUTING THE RATIO OF
SCATTERED TO DIRECTLY TRANSMITTED LIGHT
Filed March 20, 1968

INVENTOR:
W. A. RIGGS

BY J. E. Beisner

HIS ATTORNEY

United States Patent Office 3,518,437
Patented June 30, 1970

3,518,437
APPARATUS FOR MEASURING HAZE IN FLOWING LIQUIDS UTILIZING AN OPERATIONAL AMPLIFIER WITH PHOTOSENSITIVE FEEDBACK AND INPUT RESISTORS FOR COMPUTING THE RATIO OF SCATTERED TO DIRECTLY TRANSMITTED LIGHT
William A. Riggs, Pasadena, Tex., assignor to Shell Oil Company, New York, N.Y., a corporation of Delaware
Filed Mar. 20, 1968, Ser. No. 714,656
Int. Cl. H01j *39/12;* G01n *21/00, 21/26*
U.S. Cl. 250—209                    4 Claims

ABSTRACT OF THE DISCLOSURE

An apparatus for measuring the haze in a flowing fluid using a source of illumination and two light-measuring means. One of the light-measuring means is disposed to measure the light that passes directly through the flowing fluid, while the second light-measuring means is disposed to measure the light that is scattered from the fluid. The light-measuring means are coupled to an operational amplifier that is disposed to operate as a ratio amplifier in order that the ratio of the signals from the two light-measuring means may be measured. The ratio signal is then used as a measurement of the haze in the flowing fluid.

BACKGROUND OF THE INVENTION

The need to measure the haze in a flowing fluid arises in many industrial processes. For example, it is necessary to measure the wax that remains in a lubricating oil after a dewaxing process. Likewise, it is necessary to measure the turbidity of a process stream; for example, the water in a hydrocarbon stream, or the catalyst particles in a hydrocarbon stream or other solids in fluid streams.

In the past, various haze-measuring devices have been developed, the majority depending upon the measurement of the amount of light that can be transmitted through the stream. A device that depends upon measuring the quantity of light that can be transmitted through the stream depends upon the critical adjustment or correlation of the instrument to known values. Thus, when the fluid flowing in the stream changes slightly, it requires a readjustment of the instrument.

In addition to the above problem of adjustment, straight quantitative measurement of the amount of light transmitted requires very sensitive instruments to detect small changes in the quantity.

In an attempt to overcome the difficulties of instruments that depend upon the direct measurement of the light transmitted through the stream, instruments have been developed in which measurement is made of the light that is directly transmitted through the stream as well as the light that is scattered by the stream. The two light measurements are then compared, as for example, in a bridge circuit with the unbalance of the bridge being used as a measurement of the haze in the flowing stream.

These instruments normally use photoelectric devices for detecting the light that is transmitted. The combination of photoelectric cells and the bridge circuit results in a circuit having poor linearity and slow response.

In addition to the above problems of circuitry, prior devices also failed to make provisions for fogging of the various optical surfaces due to low-temperature operations. Fogging of the optical surfaces produced responses similar to haze in the flowing fluids and thus erroneous results.

BRIEF SUMMARY OF THE INVENTION

The present invention solves the above problems by providing an instrument for measuring the haze in a flowing stream using a source of illumination and two photocells disposed to measure the light that is directly transmitted through the flowing stream and the light that is scattered by the flowing stream. The two photocells are coupled in opposition to one input of an operational amplifier with a reference voltage coupled to the other input. The reference voltage is adjusted so that in the absence of haze in a flowing stream the amplifier has a zero output signal. Thus, when haze appears in the stream, the photocell measuring the directly transmitted light will produce a slightly lower signal, while the photocell measuring the scattered light will produce a much larger signal. The result will be an unbalance of the amplifier and an output signal that is a measure of the unbalance.

The amplifier is preferably formed from a conventional operational amplifier provided with a feedback circuit. One of the photocells is disposed in the feedback circuit while the other photocell is disposed in the input circuit. Thus, the output voltage will be the ratio of the resistance of the two photocells.

In addition, the instrument is provided with means for preventing fogging of the optical surfaces. More particularly, the source of illumination is coupled by means of a long transparent member, as, for example, a glass rod to the sample cell of the instrument. The glass rod insulates the sample cell from the heat generated by the source of illumination, yet will transmit sufficient heat to prevent fogging of the optical surfaces of the glass rod. Further, each of the photocells is mounted in a clear, transparent member, as, for example, a plastic block. The plastic block is then firmly attached to a second transparent block, as, for example, a glass block, to provide sufficient insulation to prevent fogging.

BRIEF DESCRIPTION OF THE DRAWINGS

The above advantages and the construction and operation of this invention will be more easily understood from the following detailed description of a preferred embodiment when taken in conjunction with the attached drawings in which.

DESCRIPTION OF A PREFERRED EMBODIMENT

Figure 1:
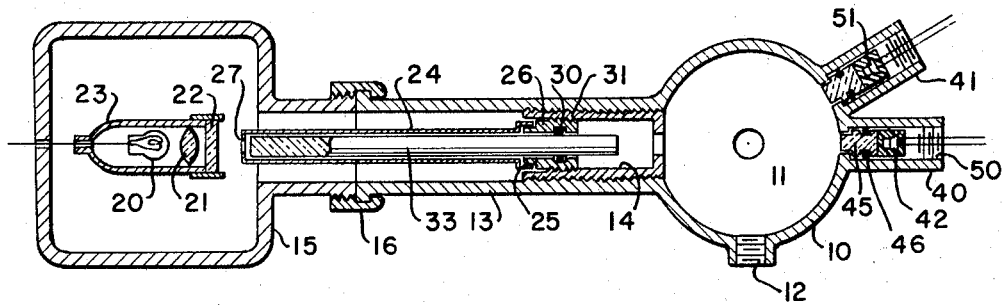
FIG. 1 is a sectional view of a light-scattering instrument constructed according to this invention.

Referring now to FIG. 1, there is shown the light-scattering instrument constructed according to this invention and more particularly the construction of the light source and the placement of the two photocell detectors. The sample cell 10 has a general tubular shape which is closed at both ends and provided with an inlet 11 in one end and an outlet 12 projecting radially outward from the side wall of the sample cell. Preferably, one end wall of the sample cell is made removable in order that the cell may be cleaned and various parts installed in the cell as described below.

Extending radially outward from the side wall of the cell is a first tubular leg 13 that contains the source of illumination. The inner end of the tubular leg is provided with a mounting means 14 that threads into the inner end of the tubular leg and is designed to support the glass rod that couples the source of illumination to the sample cell, as described below. A housing 15 that contains the source of illumination is connected or coupled to the outer end of the tubular leg by means of a coupling nut 16 that threads over the tubular projection on the housing 15. The source of illumination 23 is mounted within the housing and may consist of a conventional incandescent lamp 20 of the type used for illuminating microscopes and similar scientific devices. A lens 21 is provided for focusing the light while a filter 22 is provided for removing unwanted wavelengths from the light. More particularly, the filter should be a red photographic filter that prevents fluorescence of the sample by removing the wavelengths of light that cause fluorescence.

The source of illumination is coupled to the sample cell by means of a glass rod 33 that is encased within a tubular metal mount 24. The metal mount may be formed of thin-walled stainless tubing having its outer end 27 flanged over to retain the glass rod. The inner end 25 of the tubular mount is coupled to a mounting nut 26 by any desired means, as, for example, welding or the like. The glass rod is mounted in the first tubular leg of the sample cell by threading the nut into the mounting means 14. An O-ring 30 is disposed between the nut and the glass rod to insure a pressure-tight seal. The flange 27 at the outer end of the tubular mount prevents the glass rod from being blown out of the instrument as a result of the pressure in the sample cell.

Two additional tubular legs 40 and 41 project radially outward from the side wall of the sample cell. The tubular leg 40 is disposed on the opposite side of the sample cell with its axis aligned with the axis of the first tubular leg, while the tubular leg 41 is disposed with its axis displaced approximately 30° from the axis of the first tubular leg. A photocell 42 is encapsulated in a clear plastic block 43 which in turn is bonded to a glass block 45. The joint 44 between the plastic and the glass must be a clear bond in order that light may be freely transmitted to the photocell 42. An O-ring 46 is placed in a radial groove formed in the glass block to seal the photocell in the tubular leg while a tubular nut (not shown) threads into the end of the tubular leg to retain the photocell structure in place. The second photocell 51 is encapsuled in a similar structure and retained in the leg 41 in a similar manner.

The above construction utilizing a long glass rod 33 to transmit the illumination from the source to the sample cell insures that the heat generated by the source will not be transmitted to the sample cell. At the same time the glass rod will transmit sufficient heat to prevent fogging of the ends of the glass rod adjacent the sample cell. Also, the structure used for mounting the photocells insures that the end of the glass mounting that projects into the sample cell will not fog, since it is insulated from the remainder of the structure by the plastic in which the photocell is encapsulated. Thus, the end of the photocell structure will not fog and the possibility of one photocell being fogged while the other remains clear will not arise.

Figure 2:
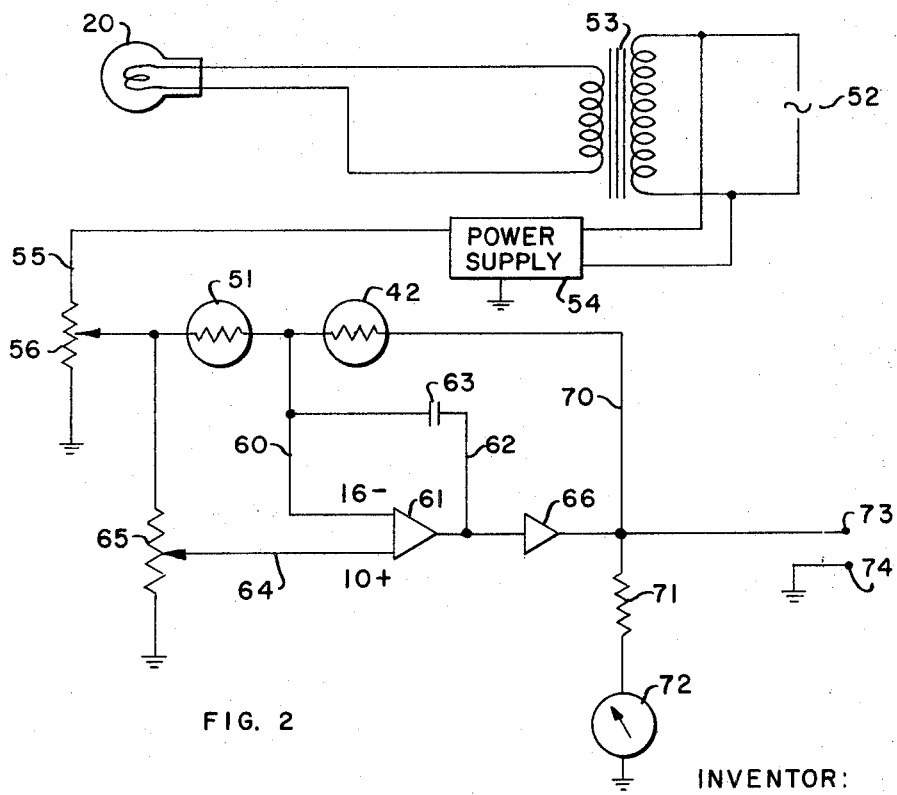
FIG. 2 is a schematic diagram of the circuit used in combination with the instrument shown in FIG. 1.

Referring now to FIG. 2 there is shown a schematic diagram of the circuit used with the instrument shown in FIG. 1. More particularly, the illumination source 20 is supplied with power from a conventional 110 AC power supply 52 and transformer 53. The transformer 53 should reduce the voltage to a relatively low level for operating the light 20, since it is preferable to operate the light below its rated voltage to increase its useful life. For example, if the light used has a rating of 6½ volts, it may be operated at 5 volts and thus increase its useful life. The two photocells 42 and 51 are powered by a power supply 54 that is coupled by a lead 55 to a potentiometer 56. The potentiometer serves as a sensitivity adjustment for the circuit and in effect controls the voltage supplied to the two photocells. This is possible since the photocells are resistance-type devices whose resistance varies with the quantity of light falling on the cells.

The common connection between the two photocells is coupled by means of a lead 60 to one input of a differential amplifier 61. The differential amplifier may be a conventional operational amplifier that is provided with feedback loop 62 having a capacitor 63 disposed therein. The differential amplier is also provided with a set voltage at its other input by means of a lead 64 and a variable resistor 65. The potentiometer is adjusted so that the output signal of the system is substantially zero when the fluid in the sample cell is clear.

The output of the differential amplifier is coupled to a second operational amplifier 66 whose output is fed back by means of a lead 70 and the photocell 42 to the input of amplifier 61. Thus, the system will operate in a substantially balanced condition with the output of the amplifying circuit supplying a feedback voltage to balance any unbalance between the voltage existing at the common junction between the two photocells. A meter 72 may be connected between the output of the amplifier 66 and ground with a resistance 71 disposed therein. The meter will thus read the output voltage of the circuit and if desired can be calibrated in terms of haze units or other units. The output voltage is also supplied between a lead 72 and a ground lead 74 in order that it may be used to operate other equipment or can be recorded on conventional chart recorders. For example, if the device is used to measure the haze in a fluid process stream, the output signal can be used to operate controls on the process to correct the condition giving rise to the haze in the process stream.

OPERATION

The above device is operated by installing the instrument shown in FIG. 1 in a fluid stream or in a bypass around a main stream. In installing the device, care should be taken to insure that the fluid flowing through the measuring device is a representative sample of the fluid flowing in the main stream, and that the fluid continually passes through the sample cell. The circuit shown in FIG. 2 is then connected to a conventional 110 volt AC power supply and the sensitivity of the circuit adjusted by positioning the potentiometer 56. More particularly, the voltage level is increased until the current flows through both photocells. The circuit is then balanced by adjusting the potentiometer 65 until the output of the complete circuit is zero. The circuit is then ready for operation and any haze in the fluid flowing through the sample cell will cause an unbalance of the circuit. More particularly, the haze in the fluid will not materially diminish the illumination falling on the photocell 42, while the scattered light falling on the photocell 51 will be materially increased. Thus, the resistance of the photocell 51 will materially change while the resistance of the photocell 42 will remain substantially the same. Since the two photocells are coupled in series, they in effect form a voltage divider, and thus an unbalanced voltage will appear at the junction of the two photocells. This voltage will be supplied to the amplifiers 61 and 66 which in turn will supply a feedback voltage to the line 70 to again balance the circuit. Since the circuit normally operates in a balanced condition, the linearity of the amplifiers 61 and 66 will be improved and thus the response of the system will be substantially linear.

The output voltage from the amplifier 66 will be related to the ratio of the resistance of the two photocells and thus reflect any change in the transmission properties of the fluid flowing through the sample stream. Providing the circuit is adjusted to a zero output voltage when a clear fluid is flowing through the cell the output voltage can be related directly to the haze in the fluid. If desired, the meter 72 can be scaled to read directly in haze units.

I claim as my invention:
1. A light-scattering instrument for measuring the haze present in a flowing stream, said instrument comprising a source of light disposed to pass light through said flowing stream and a pair of light-detecting means, one of said light-detecting means being disposed to detect the light that passes directly through the stream and convert it to a first electrical signal, the other light-detecting means being disposed at an angle to the axis of said source to detect the light that is scattered by said flowing stream and convert it to a second electrical signal, the improvement comprising:
    coupling said other light detecting means to the input of an operational amplifier; and coupling said one light detecting means in the feedback circuit of said operational amplifier whereby the output of said amplifier is the ratio of the scattered light to the directly transmitted light.

2. The light-scattering instrument of claim 1 wherein said source of light is mounted in a first tubular leg extending radially outward from a sample cell and one of said photocells is mounted in a second tubular leg extending radially outward from said sample cell, said second tubular member being positioned opposite said first tubular leg and the other of said photocells being mounted in a third tubular leg extending radially outward from said sample cell, said third tubular leg being angularly displaced from the direct beam of said source.

3. The light-scattering instrument of claim 2 and in addition a long transparent member disposed in said first tubular member to couple the radiation of said source to the sample cell.

4. The light-scattering instrument of claim 2 and in addition each of said photocells being sealed in a transparent member and then bonded to a second transparent member, the second transparent member of each photocell being sealed in said second and third tubular legs.

References Cited

UNITED STATES PATENTS

| | | | |
|---|---|---|---|
| 2,324,304 | 7/1943 | Katzman | 250—227 X |
| 2,925,007 | 2/1960 | Silver | 356—103 |
| 3,053,985 | 7/1962 | Grammer et al. | 250—214 X |
| 3,125,684 | 3/1964 | Borgoyn et al. | 250—239 |
| 3,202,826 | 8/1965 | Greathouse | 356—208 X |
| 3,234,846 | 2/1966 | Cropper et al. | 356—208 X |
| 3,379,991 | 4/1968 | Clerc et al. | 250—214 X |
| 3,382,762 | 5/1968 | Vasel et al. | 250—218 |
| 3,450,886 | 6/1969 | Lown | 250—214 X |

WILLIAM F. LINDQUIST, Primary Examiner

T. N. GRIGSBY, Assistant Examiner

U.S. Cl. X.R.

250—214, 218, 227, 239; 356—104, 207, 208